United States Patent [19]

Hagen et al.

[11] 4,201,423

[45] May 6, 1980

[54] SYNCHRONIZED TRAVELING CARRIAGE ASSEMBLY

[75] Inventors: Magnus F. Hagen, Laguna Beach; Donald Stanley, El Toro, both of Calif.

[73] Assignee: Standard Precision, Inc., Santa Fe Springs, Calif.

[21] Appl. No.: 874,385

[22] Filed: Feb. 2, 1978

[51] Int. Cl.² ............................................. F16C 29/00
[52] U.S. Cl. ...................................... 308/6 R; 74/25; 308/3 A; 308/3.8
[58] Field of Search ................ 308/3 R, 3.6, 3 A, 3.8, 308/6 R, 6 C, 35; 74/25; 312/331

[56] References Cited

U.S. PATENT DOCUMENTS

| | | | |
|---|---|---|---|
| 3,857,618 | 12/1974 | Hagen et al. | 308/3.8 |
| 3,966,273 | 6/1976 | Hagen et al. | 308/6 R X |
| 4,028,949 | 6/1977 | Hagen | 74/25 |

Primary Examiner—Douglas C. Butler
Attorney, Agent, or Firm—Francis X. LoJacono

[57] ABSTRACT

A synchronized traveling carriage assembly comprising at least one slide mechanism held by a end-support cap having alignment pins to firmly hold it in a rigid position. The outer side of the support cap includes support pins so as to be readily acceptable in a cooperating installation. A carriage plate is affixed to the moving slide member whereby various devices may be mounted thereto. The slide comprises an outer slide member which is removably connected to the alignment pin of the support cap, an inner slide member, and a ball-retainer member disposed therebetween having at least two flat strips of friction material coacting with at least one intermediate member formed by an endless belt of friction material—the flat strips being affixed to respective inner and outer slide members and the endless belt being movably mounted to the ball-retainer member for engagement with the flat strips.

13 Claims, 13 Drawing Figures

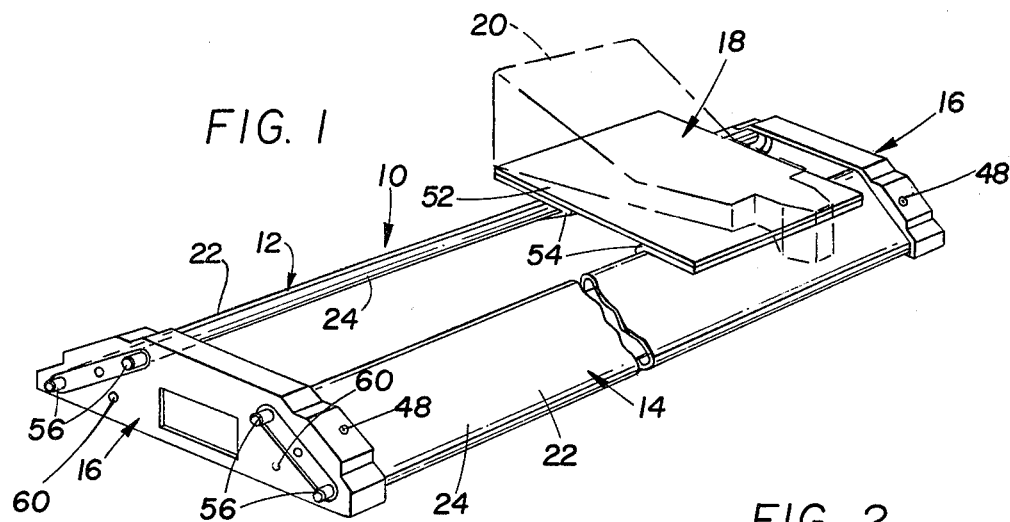
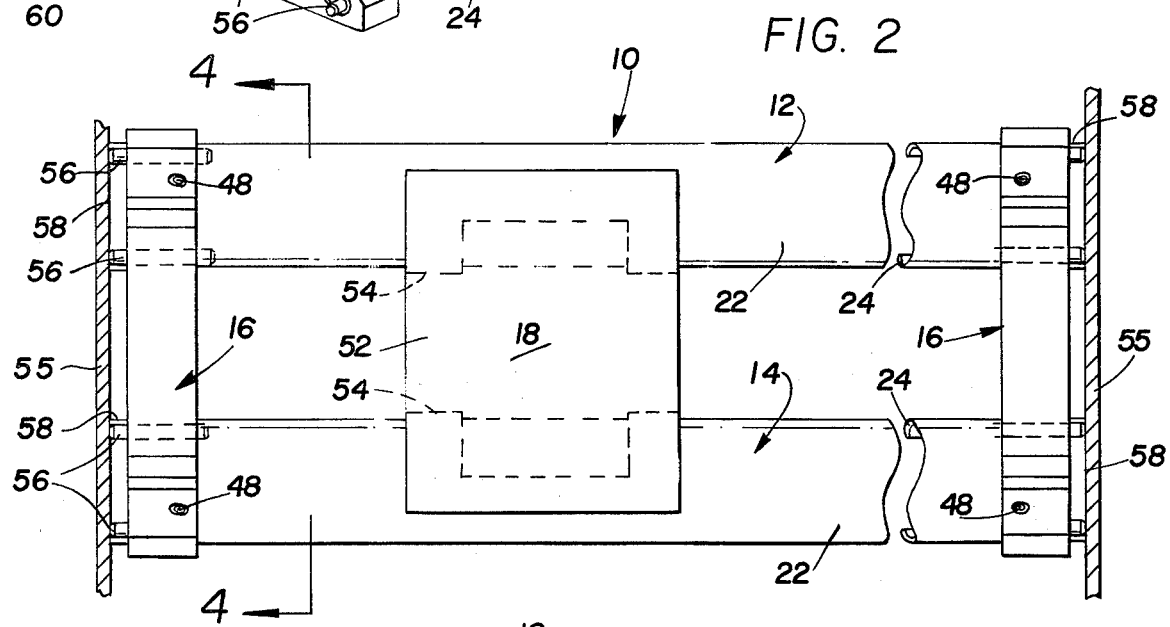
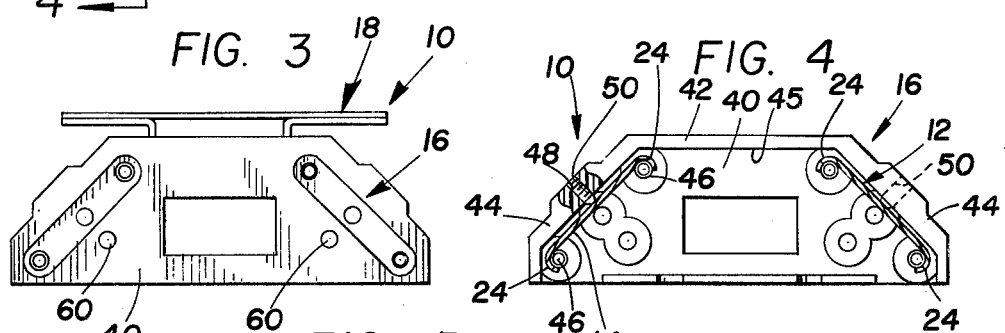
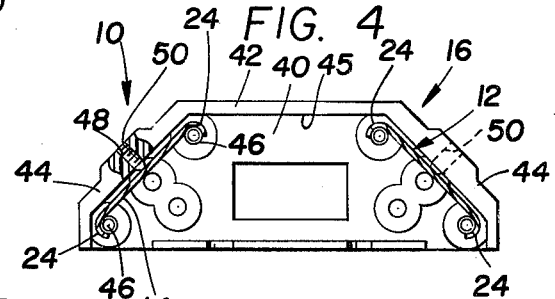
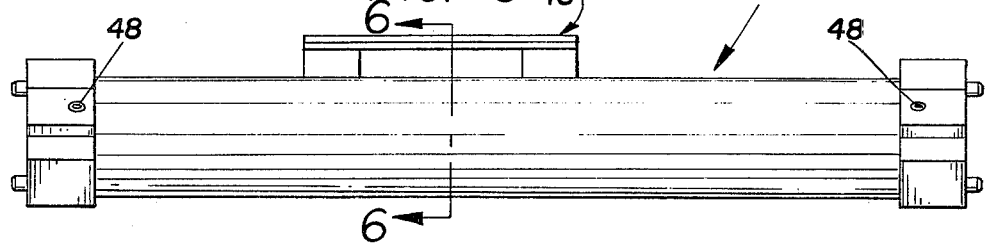

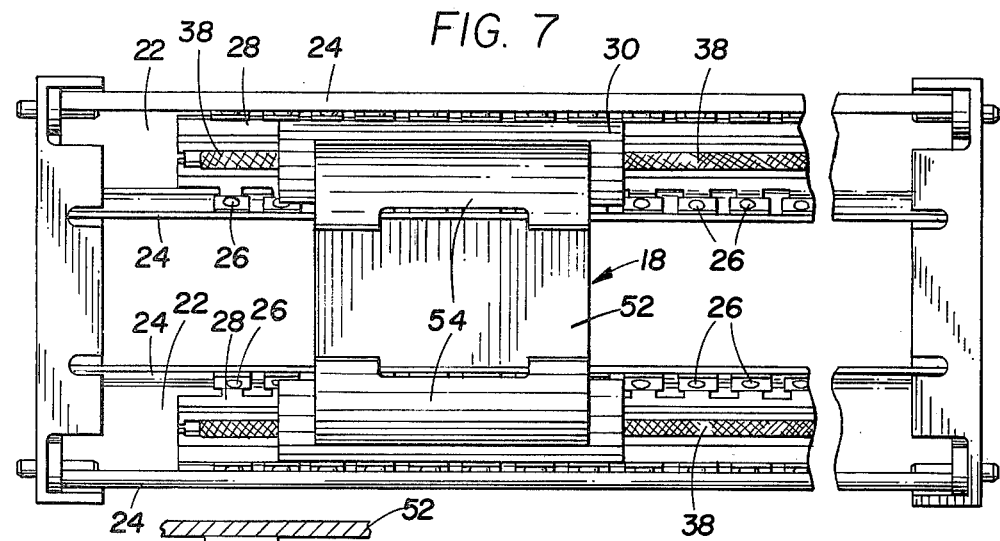
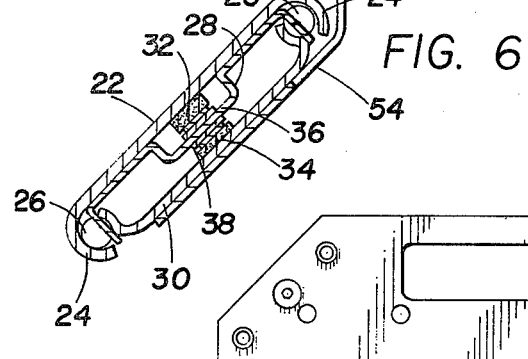
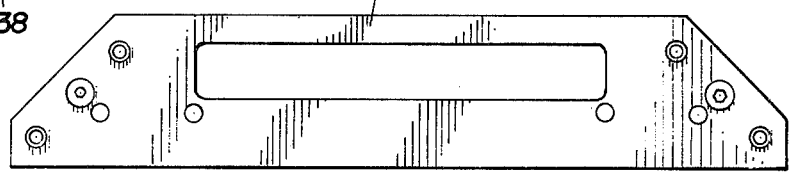
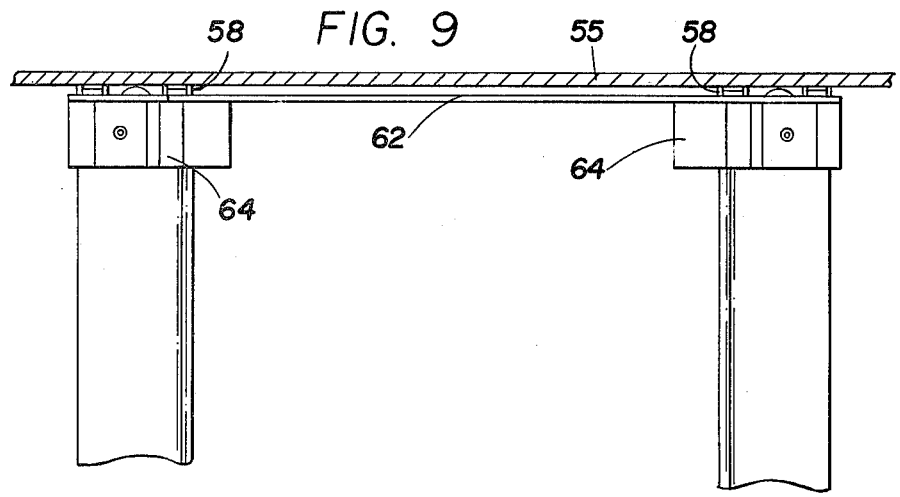

SYNCHRONIZED TRAVELING CARRIAGE ASSEMBLY

BACKGROUND OF THE INVENTION

1. Field of the Invention

This invention relates generally to a linear carriage device and, more particularly, to a carriage assembly having slide members wherein a synchronized linear travel output is provided and precisely maintained.

2. Description of the Prior Art

As is well known, several linear moving devices have been proposed for maintaining a controlled relationship between various longitudinally movable parts. However, suitable means have not been satisfactorily provided in many areas where rigid, synchronized, longitudinal movement is essential to a particular instrument or piece of equipment.

Many devices, such as a matrix printer carriage, impact (daisy wheel, IBM ball, etc.) printer carriage, typewriter carriage, typesetting printer carriage, optical character-reader carriage, lens-and-mirror-mechanism carriage, etc., are in use at the present time.

However, many of the above devices are very costly to manufacture and maintain in the required working condition—this being caused, in many cases, by complicated assembly functions of multiple-component subassemblies. Further, expensive alignment of multiple components, shafts, bearings, carriage platforms, etc. have been in the past inherent to several of the known devices.

Accordingly, there is a need for a single unit assembly that will provide and assure maximum performance under all operating conditions—and, when necessary, can be readily removed and replaced in seconds.

SUMMARY OF THE INVENTION

The present invention resides in a carriage assembly formed as a single unit to provide a controlled, synchronized, linear movement of an item attached to the carriage assembly. The invention comprises a carriage assembly having at least one or more slide mechanisms and preferably at least one pair of slide mechanisms arranged in longitudinal, parallel relationship to each other, and held in such a relationship by end-support-cap members. Each cap member is provided with alignment pins which engage and support respective slide mechanisms. That is, each slide mechanism comprises an outer slide member which is rigidly connected to the support pins of the end cap, an inner slide member being arranged to slidably move with respect to the outer slide member, and wherein a ball-bearing retainer is slidably positioned between the inner and outer slide members and includes a plurality of bearings. A part or piece of equipment that is to be linearly moved by the slides is secured to a platform that is connected to the slide mechanisms; and, thus, the part or piece of equipment can be longitudinally moved from one end of the carriage to the other end in a precise manner heretofore not possible with other known devices.

Further, included within the slide members are at least two flat strips of friction material coacting with at least one intermediate member formed by an endless belt of friction material. The flat strips are secured to respective slide members; and each flat strip engages the intermediate member, wherein the intermediate member is movably mounted to the ball-bearing retainer member.

For a better understanding of the synchronizing action created between the frictional flat strips and the endless movable belt member, please refer to U.S. Pat. No. 4,028,949 issued to Magnus F. Hagen, a co-inventor of the present invention.

Once the end cap is connected to the slide mechanism, the carriage assmebly may be readily installed and removed from a particular piece of equipment, due to its simple alignment and support features. That is, the end cap also includes outer extending support pins which are arranged to be received in corresponding mating brackets installed within the particular piece of equipment.

OBJECTS AND ADVANTAGES OF THE INVENTION

The present invention has for an important object a provision for a carriage assembly that can be readily adapted to almost all known pieces of equipment or devices that require accurate linear movement of the parts within its system.

It is another object of the invention to provide a unique, linear, synchronized movement of a carriage assembly wherein a precise, long-lasting, trouble-free, linear movement is imparted within a single unit assembly.

Another object is to provide a carriage assembly that includes a pair of slide mechanisms that are positioned in a spaced, parallel arrangement; and wherein the slide mechanisms are rigidly held in place by end-supporting caps, which are also arranged to be readily and removably received in most known devices using linear traveling carriage assemblies, such as typewriters, matrix printing devices, mechanical component-positioning units and electronic component-positioning devices.

It is still another object of the invention to provide a synchronized, traveling, carriage assembly that assures maximum performance accuracy, including a pre-alignment means—thus eliminating expensive alignment of multiple components, shafts, bearings, carriage platforms, etc.

It is a further object of the invention to provide a carriage assembly of this character having a simple attachment for removably mounting the carriage to chassis sides and/or attachment to the equipment base.

It is still a further object of the invention to provide an assembly of this type wherein the carriage platform is designed to be easily adaptable to suit various types of platform drives, such as timing belts, cables, helical screws, etc.

Still another object of the present invention is to provide a carriage assembly of this character that will support any unit—such as a matrix-printing head or reader head—where the functional design requires the unit to traverse in a precise linear manner, and retain the required accuracy and alignment over a wide range of linear velocities and cycles.

It is still a further object of the invention to provide a linear, traveling, carriage assembly that is easy to service and maintain, and is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and we contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a perspective of the present invention;

FIG. 2 is a top-plan view thereof;

FIG. 3 is an end-elevational view;

FIG. 4 is a cross-sectional view taken substantially along line 4—4 of FIG. 2;

FIG. 5 is a side-plan view of the carriage assembly;

FIG. 6 is an enlarged, cross-sectional view of one of the slide mechanisms taken along line 6—6 of FIG. 5;

FIG. 7 is a bottom-plan view thereof;

FIG. 8 is an end view showing an alternative supporting end cap;

FIG. 9 is a top-plan view of one end of the carriage assembly having an elongated end cap member, whereby the opposing slide mechanisms are spaced apart at a greater distance than shown in the preceding views;

DESCRIPTION OF THE PREFERRED EMBODIMENT

Figure 10:
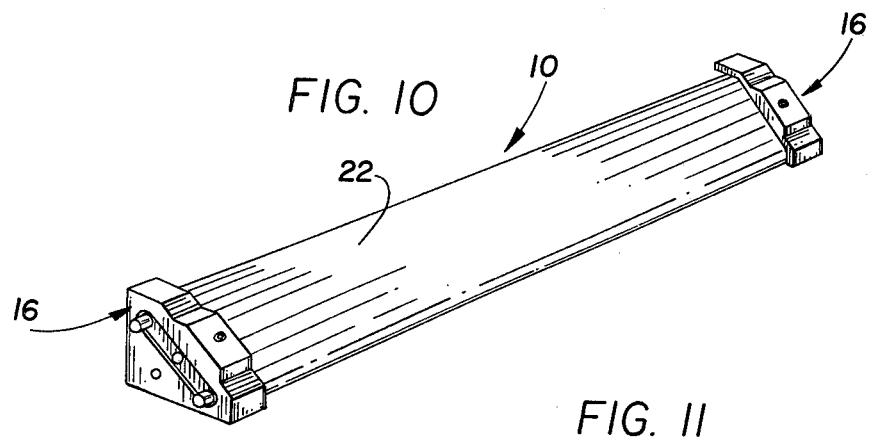
FIG. 10 is a perspective view of a single slide mechanism.

Referring now to the present invention as herein illustrated there is shown a linear carriage assembly, generally indicated at 10, wherein the carriage assembly includes one or more slide mechanisms as shown in FIG. 10. It should be understood that various conditions will require different carriage arrangements, as will be hereinafter described. Thus, the preferred embodiment is shown in FIG. 1, wherein a pair of slide mechanisms is designated at 12 and 14, respectively. These slide mechanisms are laterally spaced apart in parallel relationship to each other by means of a pair of end-alignment-support caps, indicated generally at 16. Mounted to and interconnecting each slide mechanism is a longitudinally movable carriage means, designated at 18. The carriage means is so adapted as to be capable of carrying and supporting various components, represented by phantom lines 20. Thus, carriage means 18 is designed to support any unit, such as a matrix printer head or reader head, etc., where the functional design thereof requires the unit to traverse in a precise linear manner, and retain the required accuracy and alignment over a wide range of linear velocities and cycles.

Referring now to the slide mechanisms 12 and 14, the detailed description of one slide will suffice, as both slides are identical and operate in the same manner. Accordingly, each slide comprises an outer elongated slide member 22 formed having the free longitudinal edge thereof arranged to define a pair of opposing raceways 24. The raceways are adapted to receive ball bearings 26, the ball bearings being held in said raceways by a ball-retainer member 28, wherein said retainer member is interposed between said outer slide member 22 and an inner slide member 30. Generally, and in this particular arrangement, the outer slide member 22 is substantially fixed from any movement, while the inner slide member is free to traverse longitudinally along the outer slide member by directly engaging ball bearings 26, as seen in FIG. 6. Hence, both the linear slide member and the ball retainer move longitudinally in a two to one ratio along outer slide member 22.

However, in order to precisely maintain the respective relationship between retainer 28 and inner slide member 30, synchronizing means are provided for operably interconnecting the movable parts 28 and 30. This means comprises two layers (or multiples thereof) of strip members 32 and 34 of friction material which are rigidly mounted in substantiallay parallel planes which are operably spaced apart. Strip member 32 is affixed to the inner face of outer slide member 22; and strip member 34 is secured to the inner face of inner slide member 30, whereby the main body 36 of retainer 28 is interposed between the spaced strip members 32 and 34, as illustrated in FIG. 6.

Movably supported to ball-retainer member 38 is a continuous flexible band or belt 38 which is mounted to said retainer, so as to move longitudinally as said retainer 28 and inner slide member 30 are traversed along said outer slide member 22. To provide the movement of belt 38, each opposing strip 32 and 34 engages belt 38; that is, the intermediate parts of band or belt 38 are parallel to and frictionally engage the respective adjacent strips of friction material, as said band or belt travels longitudinally between the strips of friction material.

It should be noted at this time that the slide mechanisms may be operated manually or by a power means, such as an electric motor or other suitable means connected to a movable part.

The straight flat strips 32 and 34 are made of a fabric, plastic or any other suitable material having bristles or the like on one side thereof. The traveling belt 38 comprises a flexible endless strip of any suitable material such as fabric, plastic or the like that would be compatible with the flat strips 32 and 34. A more detailed description of the operation of the above strips and belts can be found in U.S. Pat. No. 4,028,949. The principles of this patent are incorporated herein to provide a linear movement of slide mechanisms heretofore unknown.

Accordingly, to properly operate the opposing slide mechanisms, they must be rigidly held in parallel relationship to each other; and, in this device, the strict alignment-support of slides 12 and 14 is established by end-alignment caps 16 which are adapted to be removably mounted to the free ends of each slide mechanisms, as seen in FIGS. 3 and 4.

Said alignment-support caps are defined by a strut body 40 having a top wall 42 and side walls 44, the side walls being angularly disposed inwardly and thus forming a cavity 45 to receive the free ends of the outer slide members 22, whereby the slide mechanisms are supported in an angular arrangement to each other, as seen in FIG. 4.

In addition, there is provided securing means within each cap member 16, said means comprising a pair of steel dowel pins 46 located on each side of cavity 45; and each dowel is positioned angularly with respect to top wall 42 and parallel to side walls 44. Each dowel pin of its respective pair is spaced apart so as to be received in the open ends of raceways 24. Thus, the outer slide is directly connected and supported by dowels 46, as shown in FIG. 4.

Further, the securing means includes a set screw 48 which is adapted to be received in threaded bores 50 formed in side walls 44 of end caps 16. Hence, once the slides are positioned on dowel pins 46, they are then locked into place by screws 48.

This, then, allows the carriage means 18 to be linearly moved along the corresponding slides. Carriage means 18 comprises a platform 52 having attached supporting brackets 54 which are secured to each inner slide member 30 (see FIG. 6).

In order to provide a mounting means whereby the carriage device can be securely located in a particular chassis, such as indicated at 55, dowel pins 46 are allowed to extend outwardly of the strut body 40, as indicated at 56. This, then, allows the pins 46 to be located and supported in any suitable means arrange on chassis 55; and, in this case, the means is shown as wall brackets 58. Further, there is included a plurality of tapped holes 60 wherein the carriage assembly is fixedly secured to a particularly arranged chassis.

Referring now to FIGS. 8 and 9, there is shown an alternative embodiment of end caps 16. The strut body of end caps 62 has been laterally elongated to illustrate how the carriage can be designed for various components. Thus, the side angular walls 64 remain at an angular position, but still in parallel relationship to each other.

Figure 11:
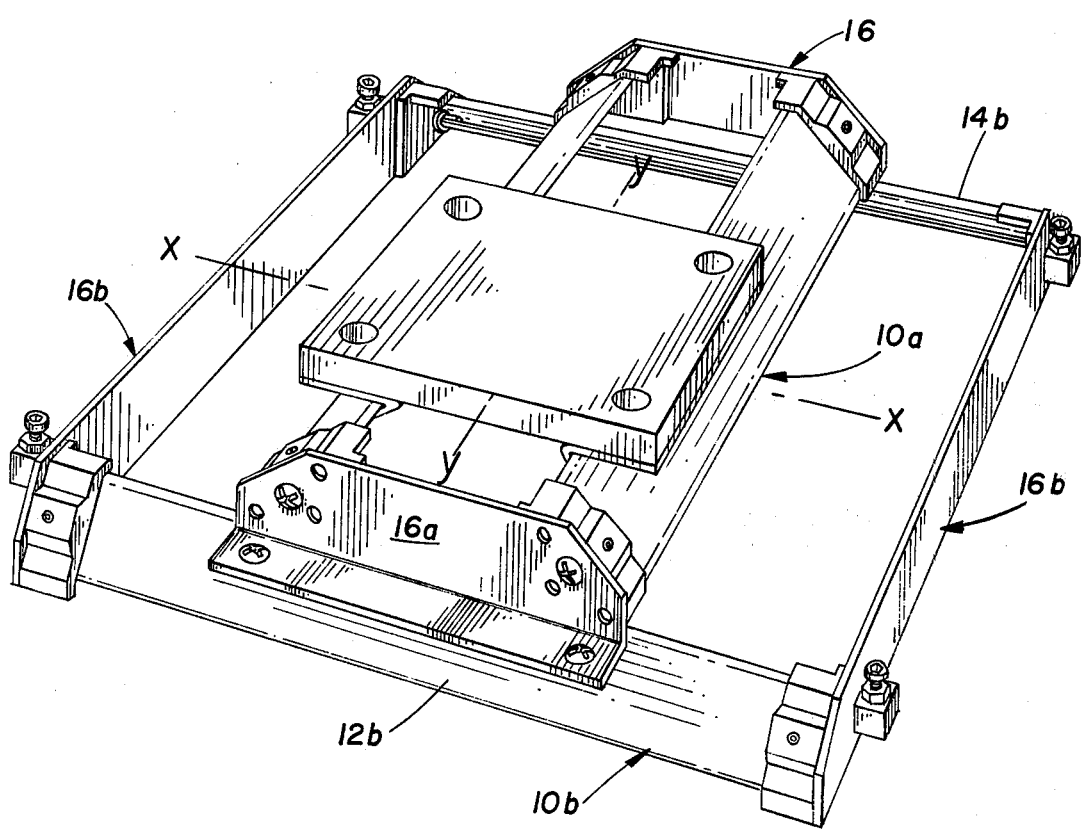
FIG. 11 is a pair of linear carriage assemblies arranged one on top of the other, providing an X-Y linear motion.
Figure 12:
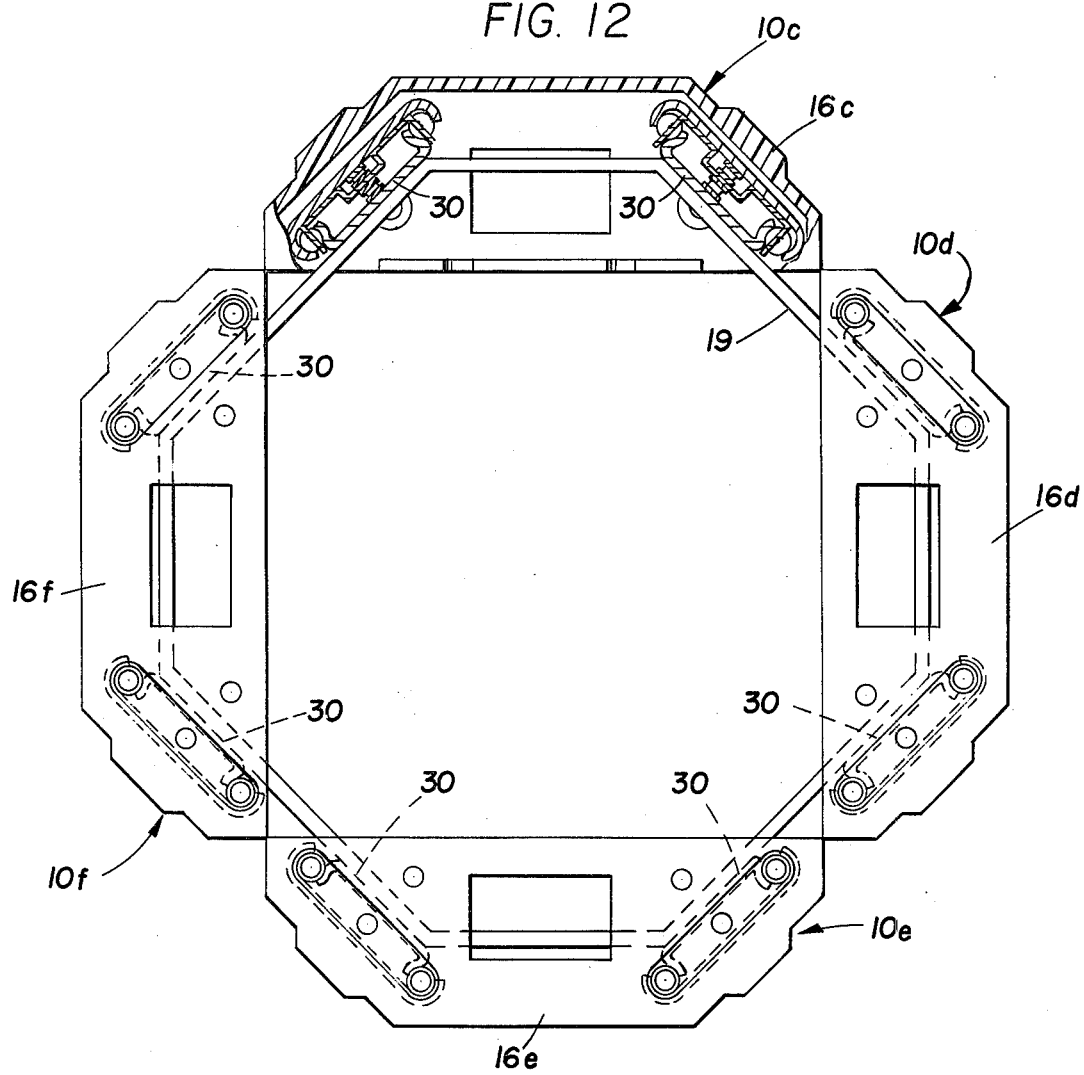
FIG. 12 is an end-elevational view of a plurality of carriage assemblies joined in a linear displacement.

It should be further understood that other various construction arrangments and configurations are possible, two of which are respectively illustrated in FIGS. 11 and 12. In FIG. 11, a pair of carriage assemblies 10 is connected together, wherein carriage assembly 10a is supported by carriage assembly 10b. That is, carriage assembly 10a is mounted transversely across carriage assembly 10b, wherein end cap members 16a are secured to oppositely arranged slide mechanisms 12b and 14b, which are, in turn, held in parallel relationship to each other by end-cap members 16b. Thus, carriage assembly 10a is permitted to linearly travel along the X—X coordinate of carriage 10b. Carriage 10a further includes a mounting platform that is arranged to travel along a second coordinate Y—Y. Thus, it can be seen that various building-block arrangements of a plurality of carriage assemblies can form a coordination complex between each contiguous carriage assembly.

Figure 13:
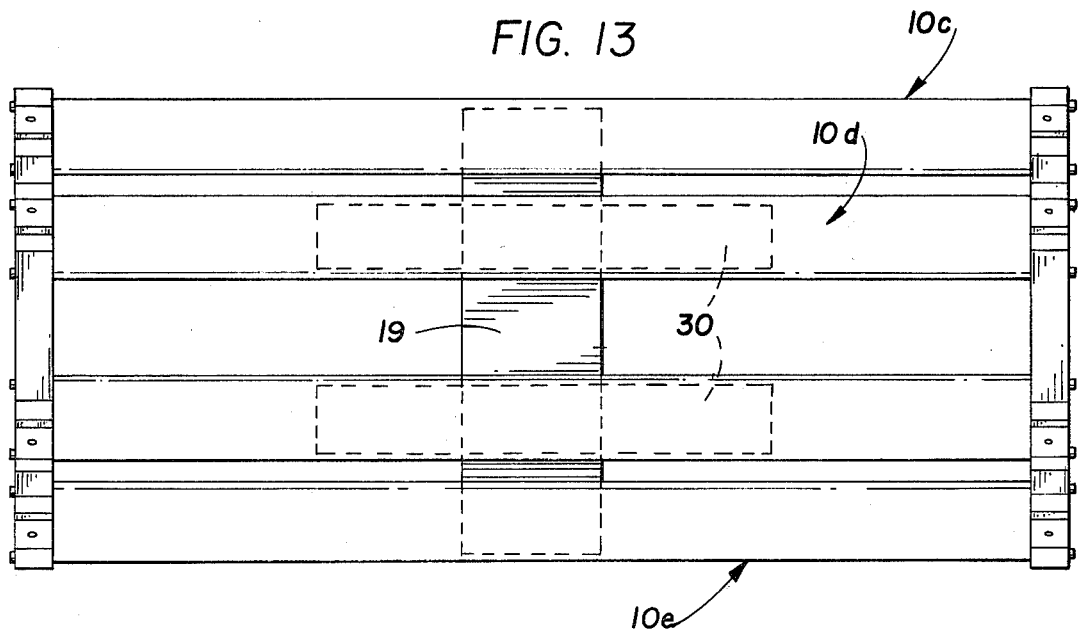
FIG. 13 is a side-elevational view thereof.

Another arrangement to be considered is that illustrated in FIGS. 12 and 13, wherein a plurality of carriage assemblies are juxtapositioned in a contiguous manner. In this arrangement, four carriage assemblies 10c, 10d, 10e and 10f are interconnected by end caps 16c, d, e, and 16f; wherein each inner, longitudinal, slidable member 30 of each slide means is interconnected by a connecting member 19, shown as a continuous band. Thus, the band can provide a means for mounting other elements that must be accurately moved along a longitudinal path.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and we do not wish to be restricted to the specific form shown or uses mentioned, except as defined in the accompanying claims.

We claim:

1. A synchronized, traveling, carriage assembly for mounting in various chassis structures, said carriage assembly comprising:
   slide means, said slide means including one substantially stationary member, an inner longitudinal slidable member, and an intermediate slidable member;
   a carriage means mounted to said inner longitudinal slidable member, whereby said carriage means moves therewith;
   a synchronizing means operably interconnecting said slidable members;
   a pair of support end caps arranged to receive said slide means therein, each of said end caps comprising an elongated strut body having peripheral wall members defining a cavity therein to receive said stationary member therein;
   securing means disposed in said end caps for securing engagement of said slide means, wherein said securing means comprises a plurality of dowel pins disposed in said cavity to be received in said stationary member.

2. The invention as defined by claim 1, wherein said stationary member of said slide means defines an outer slide member fixedly secured to said end cap by said securing means; and said inner member defines an inner slide member arranged to move longitudinally with respect to said outer slide member; and wherein said intermediate slidable member defines a bearing-retainer member, said bearing retainer including bearings interposed between said outer and inner slide members.

3. The invention as defined by claim 2, wherein said carriage means comprises:
   a carriage platform; and
   bracket members fixedly secured between said carriage platform and said inner slide member.

4. The invention as defined by claim 3, wherein said outer slide member includes longitudinal free edges forming raceways throughout the length thereof to operably receive said bearings therein, said raceways being provided with open ends.

5. The invention as defined by claim 4, wherein said securing means includes a set screw mounted in the peripheral wall of said strut body for locking engagement with said outer slide member.

6. The invention as defined by claim 5, wherein said mounting means comprises a plurality of dowel pins disposed in said end cap and extending outwardly therefrom to engage the chassis in which said carriage is to be mounted therein.

7. The invention as defined by claim 6, wherein said synchronizing means comprises:
   a first flat strip of friction material secured to the inner side of said outer slide member;
   a second flat strip of friction material secured to the inner side of said inner slide member and spaced substantially parallel in aligned relationship to said first mentioned strip; and
   an interconnecting, longitudinally extending, endless, flexible, planar belt of friction material, said planar belt being movably supported by said bearing-retainer member, whereby said flat strips operably mesh with respective planar sides of said endless belt of friction material.

8. The invention as defined by claim 7, wherein said endless flexible planar belt has movement longitudinally of and parallel to said strips for effecting rolling engagement of the belt of friction material thereof with the strips of friction material.

9. The invention as defined by claim 7, wherein said peripheral wall members of said strut body include:
 a top wall member; and
 a pair of oppositely arranged side wall members, said side walls being angularly positioned inwardly and upwardly, thereby positioning, said opposing parallel slide means in an identical angular relationship to each other.

10. The invention as defined in claim 1, wherein a pair of slide means are oppositely disposed in longitudinal parallel relationship and angular linear relationship to each other, and held therein by said end caps.

11. The invention as defined in claim 10, including a pair of carriage assemblies, one mounted to the other; and wherein one is arranged having an X—X coordinate and the other arranged having a Y—Y coordinate.

12. The invention as defined in claim 10, including a plurality of carriage assemblies, one mounted to the other, so as to form a coordination complex between each carriage assembly.

13. The invention as defined in claim 10, wherein a plurality of carriage assemblies are juxtapositioned in a contiguous manner and interconnected by said end caps; and wherein each inner, longitudinal, slide member of each slide means is interconnected by a connecting member, whereby said inner slide members move linearly together.

* * * * *